United States Patent [19]

Elkins

[11] 4,447,952
[45] May 15, 1984

[54] DEVICE FOR UNDERWATER CRYOGENIC CUTTING

[75] Inventor: James H. Elkins, Picayune, Miss.

[73] Assignee: The United States of America as represented by the Secretary of the Navy, Washington, D.C.

[21] Appl. No.: 453,068

[22] Filed: Dec. 27, 1982

[51] Int. Cl.³ .............................................. B26F 1/00
[52] U.S. Cl. .......................................... 30/361; 83/16; 83/170; 30/123; 114/221 A
[58] Field of Search ...................... 83/15, 16, 170, 171, 83/743, 745; 173/DIG. 1, 31, 32; 30/361, 358, 279, 209, DIG. 1, 367, 123; 114/50–52, 221 A

[56] References Cited

U.S. PATENT DOCUMENTS

| 2,551,094 | 5/1951 | Bryce | 83/15 |
| 2,586,532 | 2/1952 | Granfield | 83/15 |
| 3,074,165 | 1/1963 | Davis | 30/361 |
| 3,526,162 | 9/1970 | Wilcox | 83/16 |
| 3,979,981 | 9/1976 | Lightstone et al. | 83/15 |
| 4,148,257 | 4/1979 | Odill et al. | 114/221 A |

Primary Examiner—James M. Meister
Assistant Examiner—J. L. Knoble
Attorney, Agent, or Firm—Robert F. Beers; Harvey A. David

[57] ABSTRACT

An underwater cutting or penetrating device includes a source of liquid nitrogen for cooling a workpiece to a cryogenic temperature before impact by an explosively driven member. Attachment by magnet or clamp, and provision for confining the coolant by flexible gasket or boot are described.

11 Claims, 6 Drawing Figures

DEVICE FOR UNDERWATER CRYOGENIC CUTTING

BACKGROUND OF THE INVENTION

This invention relates to the field of explosively operated power velocity tools and more particularly to tools and methods for use in underwater cutting, punching or penetrating of objects such as plate, piles, shafts, or the like.

Drilling and cutting of plate, pipe, or shafting underwater is a difficult task for divers. The tools used include conventional pressure fluid operated drills, saws, abrasive wheels, and the like adapted for underwater operation. Those tools are not only difficult and time consuming to use, but are also dangerous when used on an oil or gasoline filled vessel or pipe because of the heat and sparks that are generated. Explosively operated tools such as stud guns, punches, and cable cutters are also used, but their effectiveness is limited to cutting or penetration of metal of relatively thin section.

It would be of considerable practical advantage to be able to punch an opening or cut pipe, cable, or shafting of greater thickness and toughness than has been the case heretofore with existing explosively driven tools. Moreover, it would be advantageous to effect underwater cutting or punching operations without danger of spark or generation of heat in the item being punched or cut that could possibly ignite oil, gasoline, or other flammable materials adjacent thereto or contained thereby.

SUMMARY OF THE INVENTION

With the foregoing in mind, it is a principal object of this invention to provide a novel and useful method and tool for underwater use in cutting or punching operations.

Another important object of the invention is to provide a method and apparatus for explosively punching or cutting hull plate, pipe or shafting in a particularly safe and reliable manner.

Yet another object is the provision of a tool and method utilizing a cryogenic fluid, such as liquid nitrogen to effect pre-cooling of a submerged area which is to be punched or cut and for maintaining the coolant in contact therewith until the workpiece is impacted by an explosively driven ram or cutter.

A further object is the provision of apparatus of the foregoing character that is easily managed by a diver and which minimizes chances of unwanted ignition of flammable or explosive matter.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
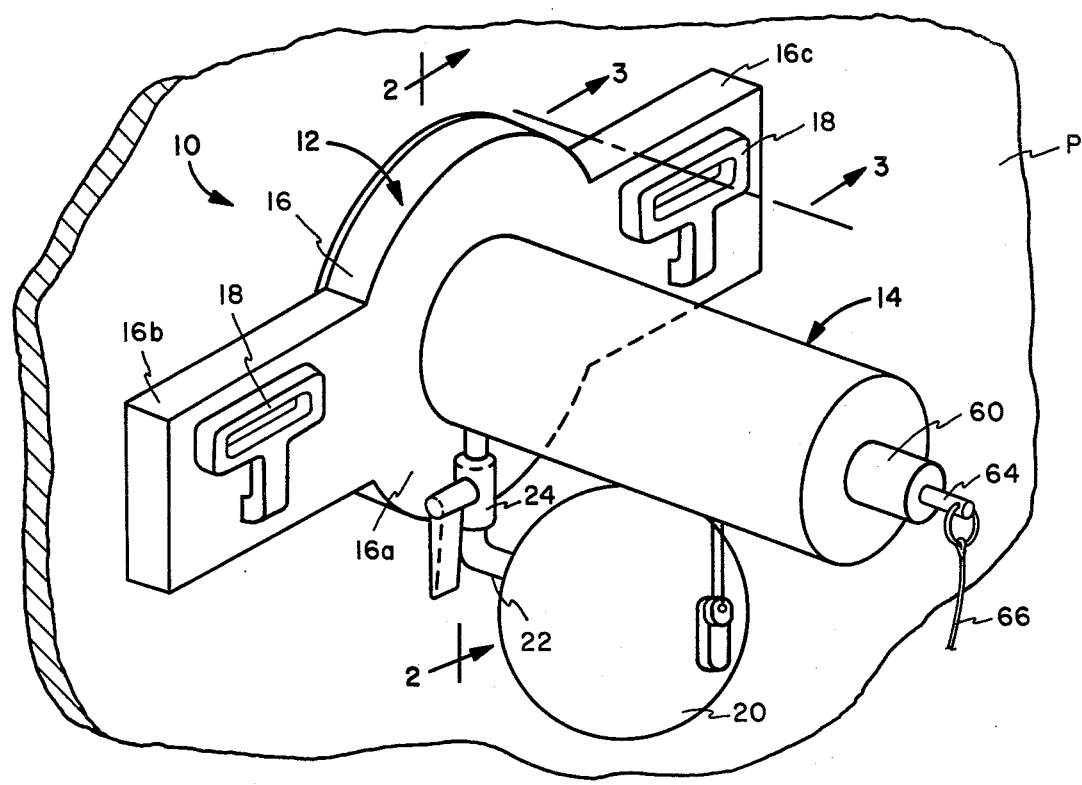
FIG. 1 is a perspective view illustrating an exemplary hull plate perforating punch device embodying the present invention.

Referring to FIG. 1, an exemplary, hole punching device 10 embodying the invention is shown in association with a hull plate P in which an opening is to be formed. The device 10 comprises an attachment and cryogenic fluid confining section, indicated generally at 12, and an explosively actuated, velocity power ram section indicated generally at 14. The attachment and cryogenic fluid confining section 12 includes, in this embodiment, a metal body 16 having a circular central portion 16a and laterally extending rectangular side portions 16b and 16c that contain magnets for securing the device 10 to the plate P. Handles 18 are actuable, as will be described later, for releasing the device 10 from the plate. A flask 20, containing a cryogenic fluid such as liquid nitrogen, forms part of the device 10, and is provided with a conduit 22 and valve 24 for controlling flow of the fluid to a confined zone of the plate P in which an opening is to be made.

Figure 2:
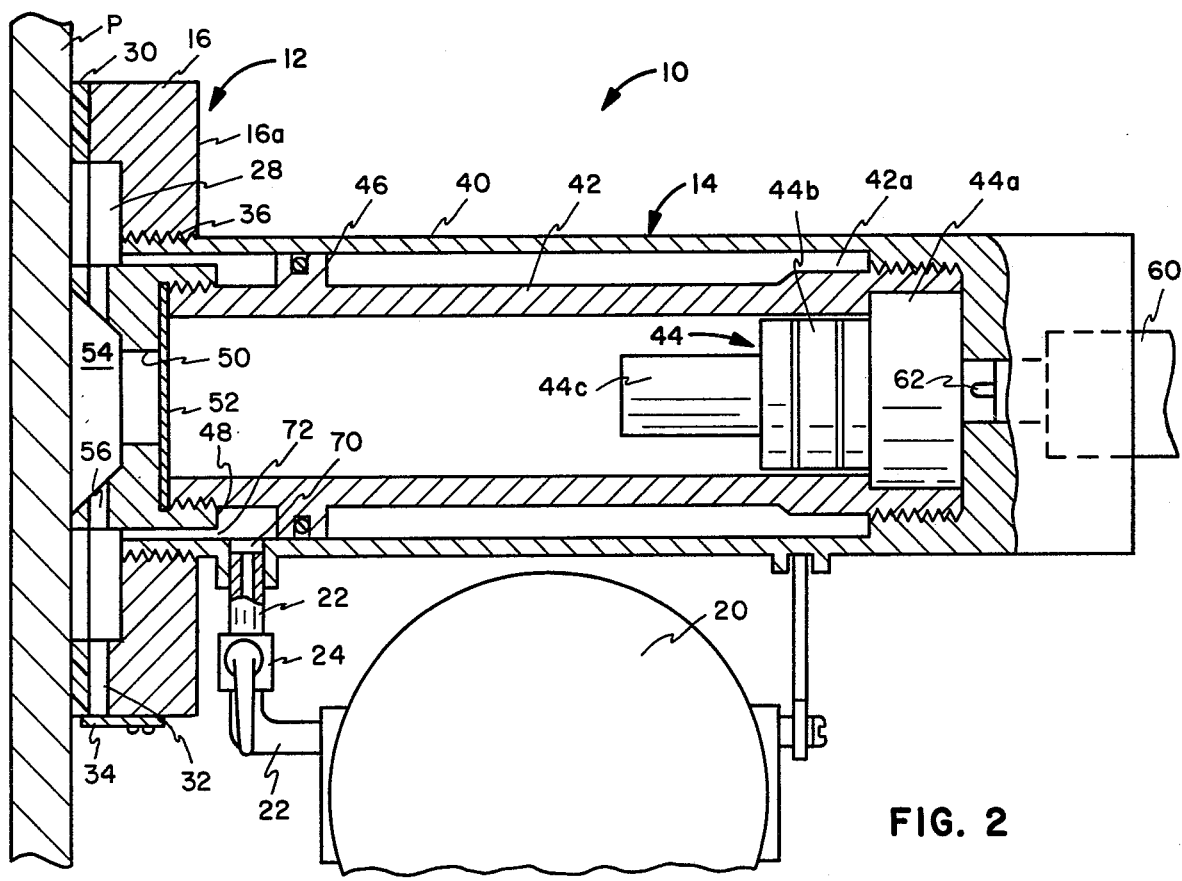
FIG. 2 is a sectional view of the device of FIG. 1 taken substantially along line 2—2 of FIG. 1.

Referring now to FIG. 2, the central circular portion 16a of the body 16 is provided with a cavity or recess 28 facing the plate P. A pliable annular gasket 30, formed of vinyl, rubber, or other resiliently conforming material is carried on the surface of the body 16 so as to sealingly engage the plate P and isolate the cavity 28 from the ambient water medium. A drain or vent passage 32 may be provided in the body 16 between the cavity 28 and the exterior, and is conveniently fitted with a one-way or check valve 34.

An internally threaded bore 36 in the body 16 receives the threaded end of the outer barrel or housing 40 of the velocity power ram section 14. An inner barrel or cylinder 42 has an externally threaded, cartridge receiving end 42a that is adapted to be unscrewed from the housing 40 for loading with a hole cutting or punching cartridge 44. In this example, the cartridge 44 is of a well known type having a main propellant casing 44a of a first diameter, a piston portion 44b of a lesser diameter, and a work contacting ram or punch 44c of a still smaller diameter.

The cylinder 42 has a flange 46 that carries an O-ring 48 for sealing engagement with the interior of the housing 40. A muzzle cap 48 is threadedly engaged on the cylinder 42 and has a central bore 50 of a diameter to nicely pass the punch 44c of the cartridge 44. The cap 48 serves to secure a cylinder seal in the form of a thin disc 52 of metal or plastic that is fitted when the device is loaded and serves to exclude water from the interior of the cylinder 42 and from the cartridge 44. The cap 48 further serves as an arresting block for the piston 44b, and projects into the cavity 28 a sufficient distance to engage the plate P when the gasket 30 is compressed. The outer side of the cap 48 is preferably counterbored at 54 and provided with radial passages 56 to permit optimum contact of cryogenic fluid with the zone of the plate or workpiece to be punctured.

The housing 40 carries a firing mechanism 60 which may be of any well known construction that causes a firing pin 62 to strike the primer cap of the cartridge 44 when a trigger 64 is actuated, as by a lanyard 66.

The flask 20, which contains a charge of liquid nitrogen or other fluid coolant at a temperature or temperatures in the cryogenic range, is controllably connected by the tubing 22 and valve 24 to an inlet port 70 of the housing 40. The port 70 communicates via the annular space 72, between the cap 48 and the housing barrel, with the cavity 28, the passages 56 in the cap assuring distribution over the impact zone of the plate P.

Figure 3:
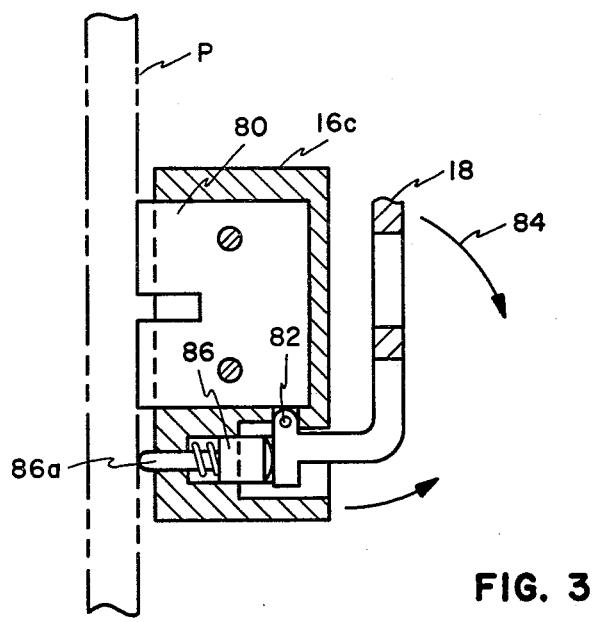
FIG. 3 is a sectional view taken substantially along line 3—3 of FIG. 1.

Referring to FIG. 3, the device 10 is secured to the plate P by strong permanent magnets 80 carried in the lateral extensions 16b, 16c. Removal of the device, from its magnetic attachment to the plate, after use is facilitated by operation of handles 18. Each handle 18 is pivoted as at 83 and, when moved in the direction of the arrow 84, provides leverage to move a plunger 86 so as to project a rod or pin 86a outwardly against the plate P. That action causes the device 10 to tilt the attachment portions as indicated by arrow 88, thereby moving the magnets 80 sufficiently away from the plate P that the device 10 falls free.

In operation, the loaded device 10 is merely positioned by the diver so the attachment and fluid confining portion is against the plate with the velocity ram portion 14 aiming at the spot to be punched or penetrated. The valve 24 is then opened to permit the nitrogen to expand into the cavity 28, expelling water therefrom and subjecting the plate to the intense cooling action of the liquid nitrogen flowing therethrough. After a short period of time sufficient for optimum cooling, the firing mechanism is actuated by pulling the lanyard. The cartridge is fired so that the piston travels with increasing velocity along the lumen of the cylinder 42. The velocity of the punch 44c striking the plate, together with the cryogenic condition of the plate, results in penetration of the punch through the plate with greater ease than without the cooling. Plate of greater thickness can therefore be penetrated with a given size punch and explosive charge.

Figure 4:
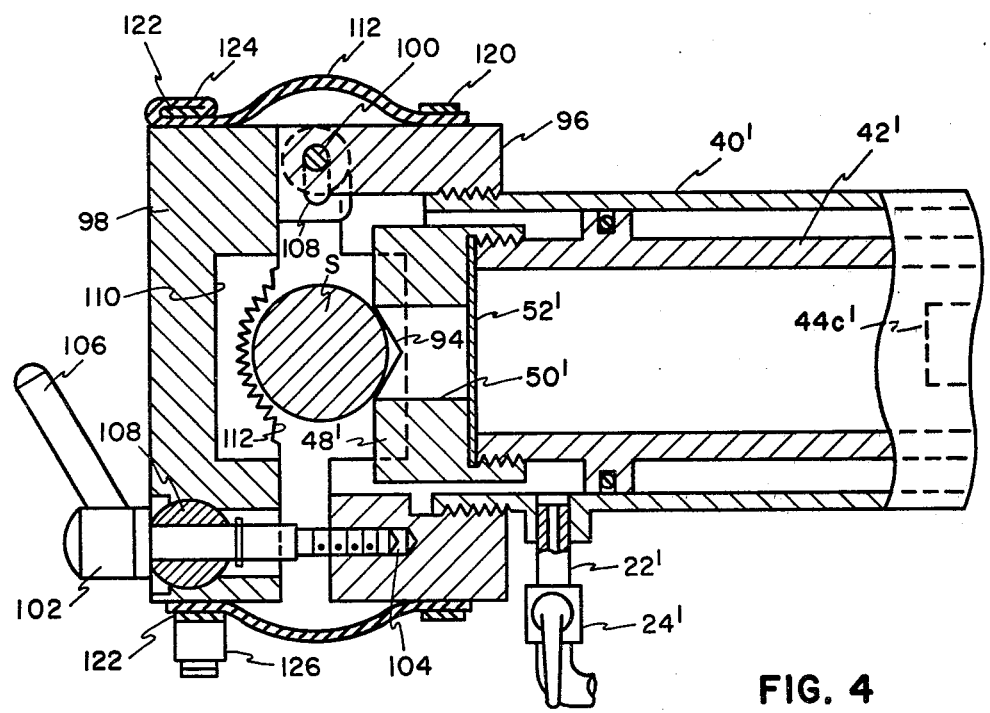
FIG. 4 is a sectional view illustrating another embodiment of the invention.
Figure 5:
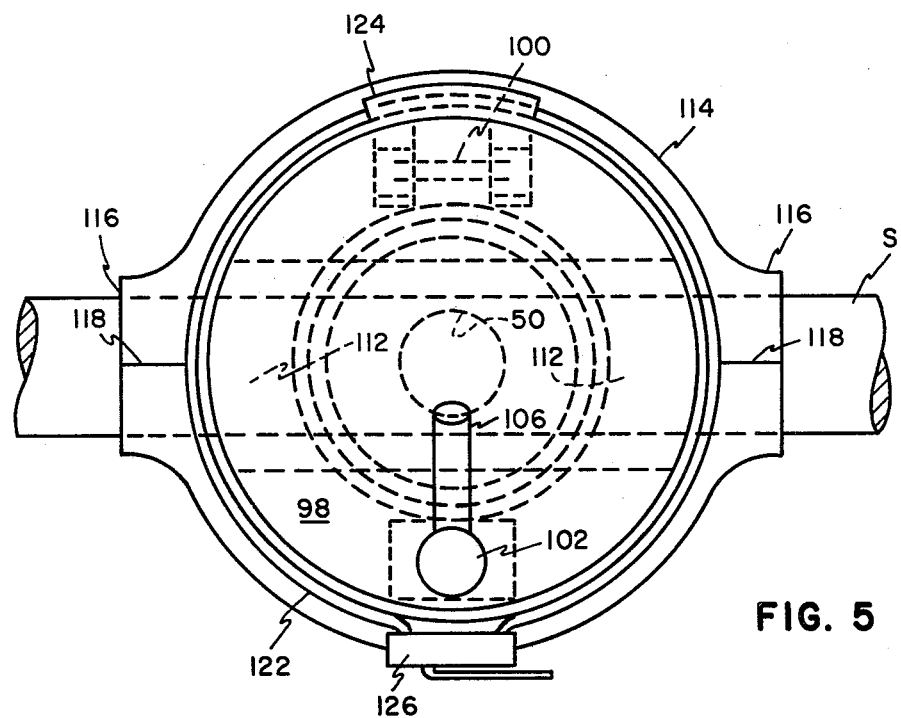
FIG. 5 is an end elevation of the embodiments of FIG. 4.
Figure 6:
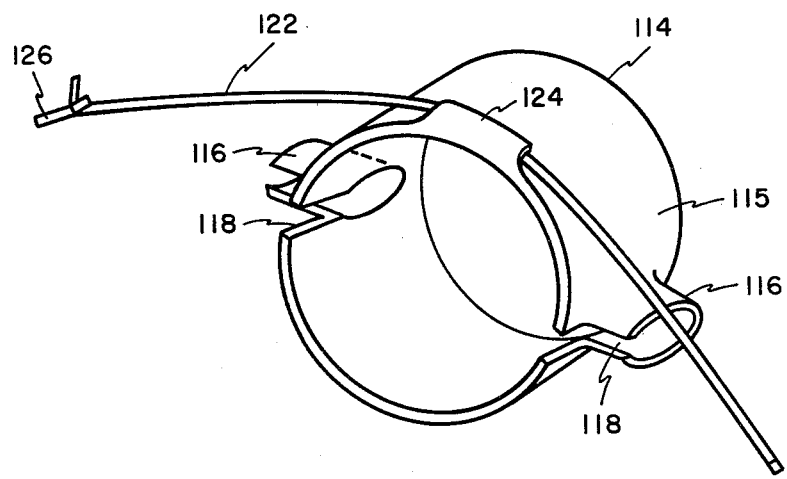
FIG. 6 is a perspective view illustrating a flexible boot component of the embodiment of FIGS. 3 and 4.

Referring now to the embodiment illustrated in FIGS. 4-6, a device 90 is shown that is particularly suited to cutting of pipe, shafting, or the like. The device 90 comprises an attachment and cryogenic fluid confining section 92 and a velocity power section 14'. The latter is similar to the power section 14 previsously described and includes an outer housing 40', cylinder 42', muzzle cap 48', sealing disc 52' and cartridge punch 44c'. In this instance the cap 48' has a transverse V-shaped groove adapted to be engaged by the shaft S or other workpiece to be cut.

The section 92 comprises a generally circular body 96, threadedly receiving the end of housing 40', and a circular end cover or body 98 hinged to body 96 as at 100. The hinged connection permits the body 98 to swing away from body 96 and be placed over and closed upon a workpiece S. A clamping bolt 102 is carried by the end cover 98 and is adapted to engage a threaded opening 104 in body 96, as shown. A handle 106 is conveniently provided for turning bolt 102. The bolt is pivotally carried relative to cover 98 by an apertured shaft 106 to accommodate changes in alignment resulting from workpieces of differing sizes. Also, the hinge 100 is characterized by elongated holes 108 for the same reason. The cover 98 is recessed at 110 and has laterally spaced jaws 112 that cooperate with the muzzle cap 48' to grip the workpiece.

A resiliently flexible boot 114, formed of rubber or the like, is clamped to the peripheries of the bodies 96 and 98 and serves to confine the liquid nitrogen or other coolant to the work area. As is best seen in FIG. 6, the boot 112 has a generally cylindrical body portion 115 and smaller, diametrically located short sleeve portions 116 extending therefrom. The body portion 114 and the sleeve portions 116 are slit at 118 to permit the boot to be flexed open to receive and then close around the shaft or other elongated workpiece S.

The end of the boot 114 not having the slits 118 is conveniently kept clamped to the body 96 by a band clamp 120 during positioning of the device 90 on a workpiece. The end cover 98 can be swung open and a workpiece passed through the slits 118 of the boot. The end cover 98 is then closed so that the jaws 112 and the groove 94 of the nuzzle cap 48' cooperate to grip the workpiece, which extends through the boot sleeve portions 116.

A second band clamp 122, which conveniently has its mid portion secured to the boot 114 by being embedded or otherwise fixed in an edge of the boot as shown at 124, is used to clamp the boot to the end cover 98 after the latter is closed on the workpiece. The band clamp 122 preferably has a toggle clamp 126 to permit easy operation by a gloved diver without using any additional tools.

When the device 90 is clamped and booted on the workpiece, the valve 24' is actuated to admit nitrogen from a flask in the same manner as with the device 10 to expel water from the interior of the section 92 through the flexible sleeves 116, so as to cool the enclosed workpiece to a cryogenic temperature that facilitates cutting or breaking by the impact of the punch or ram 44c'. Of course, the punch or ram may be provided with a chisel point or cutting edge (not shown), and when the associated charge is fired, the cooled workpiece will be readily fractured or cut.

The range of cryogenic temperatures contemplated and includes those attainable by liquid nitrogen or other liquified gases as a coolant and preferably fall in the region below about $-70°$ C. In order to accomplish this degree of cooling in the underwater environment, it is contemplated that the volume of the flask 20 is sufficient to allow metering of a coolant flow through the valve 24 or 24' into the enclosure for a prolonged time, that is more than would be necessary to simply fill the enclosure, to attain and hold a desirably low temperature while the operator positions himself and actually fires the charge.

Obviously, other embodiments and modifications of the subject invention will readily come to the mind of one skilled in the art having the benefit of the teachings presented in the foregoing description and the drawing. It is therefore, to be understood that this invention is not to be limited thereto and that said modifications and embodiments are intended to be included within the scope of the appended claims.

What is claimed is:

1. A device for performing a cutting or penetrating operation on a workpiece in an underwater environment, said device comprising:
   attachment means for securing said device to said workpiece;
   enclosure means for excluding water from a zone of said workpiece and for confining a cryogenic fluid in contact with said zone;
   velocity power means supported by said attachment means and comprising an explosively driven member adapted to impact said workpiece in said zone so as to cut or penetrate said workpiece;
   a source of fluid at cryogenic temperatures; and fluid control means for controllably passing said fluid to said zone within said enclosure means so as to cool said workpiece to a cryogenic temperature prior to and during impacting of said workpiece by said member, whereby said cutting or penetrating operation is facilitated.

2. A device as defined in claim 1, and wherein:
said enclosure means comprises a rigid body adapted to be held against said workpiece by said attachment means, said body having a cavity facing said workpiece, and gasket means disposed between said body and said workpiece and in surrounding relation to said cavity.

3. A device as defined in claim 2, and wherein:
said velocity power means comprises cylinder means for guiding said explosively driven member through said cavity and against said workpiece.

4. A derice as defined in claim 3, and wherein:
said attachment means comprises permanent magnet means carried by said body and adapted to engage the surface of said workpiece and magnetically hold said device thereagainst.

5. A device as defined in claim 4, and wherein:
said attachment means comprises means for separating said device from said workpiece.

6. A device as defined in claim 5, and wherein:
said means for separating comprises plunger means reciprocably carried by said body for movement against said workpiece, and lever means pivoted relative to said body and operative to move said plunger means so as to force said body and permanent magnet means away from said workpiece.

7. A device as defined in claim 1, and wherein:
said attachment means comprises a first generally circular body having a central bore receiving said velocity power means, a second generally circular body connected by hinge means to said first body for swinging movement between open and closed positions relative to an elongated workpiece, and screw means for drawing said first and second bodies together in clamping relation to said workpiece.

8. A device as defined in claim 7, and wherein:
said enclosure means comprises flexible boot means, said boot means comprising a cylindrical portion having opposite ends releasably clamped on said first and second bodies and having antipodal sleeve portions adapted to snugly fit an elongated workpiece when clamped between said bodies, said boot means having slits in said cylindrical portion and said sleeve portions for admitting said workpiece.

9. A device as defined in claim 8, and wherein:
said velocity power means comprises cylinder means for guiding said explosively driven member against said workpiece, a nozzle member mounted on said cylinder means and disposed adjacent said workpiece, said muzzle member having an opening for passing said explosively driven member and having a groove for receiving said workpiece.

10. A device as defined in claim 9, and wherein:
said second body having laterally spaced jaws adapted to bear against said workpiece in cooperation with said muzzle member for holding said workpiece transversely of said opening in said muzzle member.

11. A device as defined in claim 10, and wherein:
said screw means comprising a transverse shaft rotatably journalled in said second body member and having an aperture, a screw element extending through said aperture, said hinge means providing for limited lateral movement of said second body relative to said first and said shaft providing for limited pivotal movement of said screw element, whereby the latter is adapted to be aligned with and engaged in a threaded opening in said first body to accommodate workpieces of different dimensions.

* * * * *